Patented Sept. 5, 1939

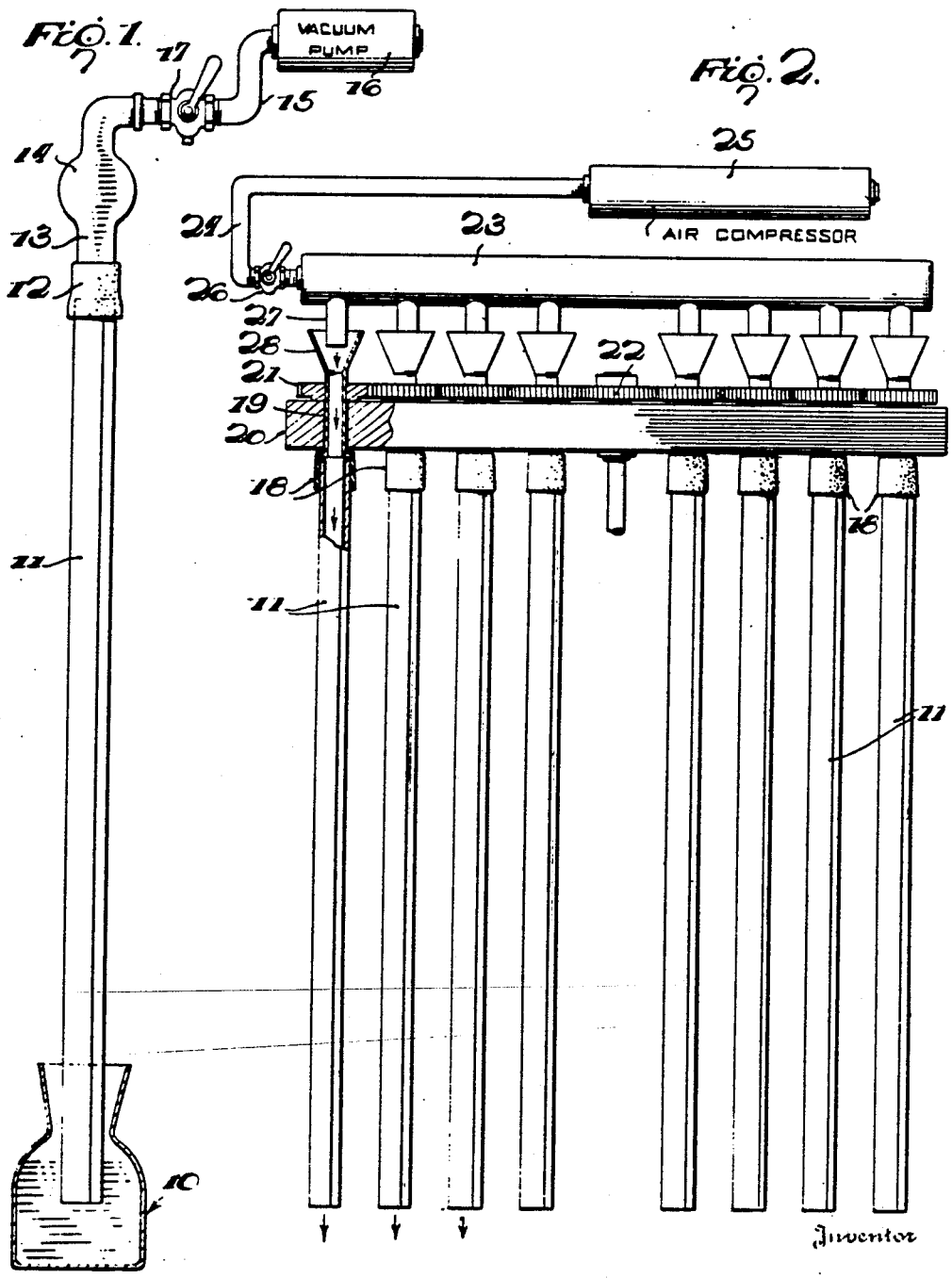

2,172,046

UNITED STATES PATENT OFFICE 2,172,046

FLUORESCENT OR LUMINESCENT LAMP COMPOSITION

Thomas M. Cortese, East Orange, N. J., assignor to Colorescent Laboratories, Inc., Newark, N. J., a corporation of New Jersey Application December 3, 1938, Serial No. 243,860

2 Claims. (Cl. 134—79)

My invention relates to bulbs or tubes for electric lamps of the fluorescent or luminescent type, to a method of applying a coating composition to the bulb or tube, and to the composition.

Fluorescent or luminescent bulbs or tubes which are now upon the market are open to some objections. The fluorescent or luminescent coating frequently flakes from the tube or bulb upon light jarring or tapping, as is encountered during shipping, handling, etc. This coating will also blow off when subjected to sudden air currents which frequently occurs during the shaping or forming of the tubes. Further, when a completed evacuated tube is in operation, and is broken, the inrush of air into the tube blows off the fluorescent or luminescent coating, in whole or in part, thus frequently necessitating the discarding of the entire tube.

A bulb or tube produced in accordance with my invention will have a fluorescent or luminescent coating which will not blow off from the tube, except for a short distance near the point of inrush of the air so that the major length of a broken tube may be salvaged, the coating will not flake from the tube or bulb when lightly tapped or jarred, which frequently occurs during shipping or handling, and further, the coating will discolor only slightly in use while most of the ordinary tubes discolor considerably more.

An advantage in the use of my coating composition is that due to its low viscosity, it will flow freely and may be more quickly and conveniently applied to the surface of a tube or bulb, in a proper and thorough manner.

Figure 1 is a side elevation of apparatus used in the practice of the method for coating the tube, and, Figure 2 is a similar view of the drying apparatus.

In accordance with my invention, I provide a low viscosity binder for the powdered fluorescent or luminescent material.

In producing this binder, I employ Celluloid as one of the ingredients. The Celluloid which I employ contains nitro-cellulose having a low viscosity of 50 to 100 seconds, and camphor present in about 25 parts by weight and nitro-cellulose present in 75 parts by weight. The camphor serves as a plasticizer and also as a stabilizer. The camphor serves to retard or prevent the discoloration of the coating of the tube, during operation. The low viscosity nitro-cellulose present in the Celluloid is important, as it imparts a low viscosity to the resultant binder. I could not use a high viscosity nitro-cellulose having 1000 seconds viscosity, as the resultant binder would have entirely too high a viscosity, for the practice of my method.

The Celluloid thus described is dissolved in a solvent, such as butyl acetate, amyl acetate, ether, alcohol, acetone, or other solvent. As a preferred example of producing the binder, I add 2 grams of Celluloid heretofore described to 100 cc. of amyl acetate, thus producing a liquid solution, having a low viscosity.

To this solution I add from one to five drops of a 10% aqueous solution of sodium or potassium silicate or a mixture of them. Proportionate amounts of weaker or stronger solutions of sodium or potassium silicate may also be used, the amounts being so proportioned as to give the same amount of sodium or potassium silicate as is contained in from one to five drops of a 10% aqueous solution. From .1 to .7 gms. of powdered boric oxide may also be added to the solution by grinding the boric oxide in binder solution in a mortar. These added inorganic substances cause better adhesion in the final product. The above constituents constitute the completed binder. This completed binder is a transparent liquid, with the boric oxide in suspension if boric oxide is added, and has a low viscosity considerably below that of an ordinary syrup so that it will pour freely.

To 100 cc. of this completed liquid binder. I then add 50 grams of a powdered fluorescent or luminescent material and the mixture is stirred to produce a homogeneous mass. As illustrations of fluorescent materials, I use calcium tungstate, zinc sulphide, zinc silicate, zinc-cadmium sulphide. These materials may also be considered as luminescent materials.

The resultant mass is a suspension of the fluorescent or luminescent powdered material and this resultant mix has a low viscosity. The viscosity is so low that the mass will flow freely and may be readily sucked up into a tube. The relative amount of the fluorescent or luminescent powder added to the binder may be varied, and it may be increased, but the addition of a further amount of powder will increase the viscosity of the mass, and would also produce a heavier coating. The coating produced by my suspended solution having the 50 grams of powdered fluorescent or luminescent material will produce a thin coating which is applied in a highly uniform manner over the entire surface.

In the use of my coating composition, in the practice of the method, the coating composition is held within a container or bottle 10. The tube 11 in the present instance, to have its inner surface coated, is vertically arranged and is suspended at its upper end by insertion within a rubber nipple or coupling 12, connected with a pipe 13, having a trap 14 connected therein. The pipe 13 and trap 14 are preferably formed of transparent glass, and as a unitary structure. A rubber hose 15 or the like is connected with the upper end of the pipe 13 and leads to a source of vacuum 16, such as a vacuum tank or a vacuum pump. Connected in the hose 15 is a valve 17, which is a two-way valve, to alternately place the pipe 13 in communication with the source of vacuum 16 and to then break this communication and place the pipe 13 in communication with the atmosphere. When the glass tube 13 is thus inserted into the tubular nipple 12, the container 10 is elevated about the lower end of the glass tube 11 so that this lower end is emersed in the liquid coating composition. The valve 17 is then manipulated to create a suitable suction within the tube 11 and the liquid coating is drawn up into the tube 11 throughout its entire length. Should any of the liquid coating pass the tube, it will be caught in the trap 14. After the liquid coating has passed upwardly throughout the entire length of the tube, the valve 17 is manipulated to cut off the suction and to place the interior of the tube 11 in communication with the atmosphere. As soon as this occurs, the excess liquid coating will drain from the inner surface of the tube and be collected within the container 10. The tube 11 is now removed from connection with the nipple 12 and its upper end is inserted in a nipple 18, and the entire tube is supported from its upper end, its lower end being spaced from the base. There are any suitable number of tubes 18, which are connected with tubular vertical rotatable shafts 19 mounted upon a horizontal support 20. These tubular shafts are provided with gears 21, in permanent mesh, and the inner gears 21 engage a master gear 22, which drives them. The tube 11 is therefore vertically supported at its top and is rotated upon its longitudinal axis, and during this rotation a regulated amount of air is blown through the tube, from its upper end to its lower end. To accomplish this, a casing or chamber 23 is arranged near and above the upper ends of the tubular shafts 19 and this chamber is connected with a pipe 24 in turn connected with the outlet end of an air compressor 25. A control valve 26 is connected in the pipe 24 to completely or partly close the pipe 24, as desired, to regulate the flow of air or to completely cut the same off. Leading into the chamber 23 are nozzles 27, arranged near and above flaring ends 28 of the tubular shafts 19. The compressed air therefore enters the upper end of the tubular shaft 19 and is conducted thereby into the upper end of the tube 11 and discharges from the lower end of the tube. The purpose of using this air is to dry the coated inner surface of the tube. The air may be employed at atmospheric temperature or it may be heated slightly such as 90° F. to 150° F. After this drying process, the tube or tubes are removed from the drying machine and may be arranged horizontally, upon trays, in a baking oven and are there subjected to a heat treatment of from 400° C. to 1000° C., depending upon the thickness of the coating produced by the fluorescent or luminescent solution, the thickness of the wall of the tube or bulb, the hardness or softness of the glass constituting the tube or bulb. The heat treatment will be such as to obtain a proper adhesion between the fluorescent or luminescent particles of the coating and the wall of the container or tube which is believed to be due to the fusion to a certain extent between the glass and particles.

The tubes or bulbs coated with my fluorescent or luminescent material or composition may have their inner or outer surfaces thus treated and the tubes or bulbs may be clear or colored glass. I contemplate treating in a similar manner other articles or containers relating to gaseous electric discharge devices including mercury vapor tubes and tubes or devices having a gaseous atmospheric condition. One of the lamp devices to which my coating may be applied is illustrated in the patent to J. L. Cox 2,093,693. The tubes, bulbs or devices, coated with the fluorescent or luminescent material are adapted to be used in interior lighting, decorating, advertising, and other applicable purposes that might disclose themselves from time to time.

While the tubes are being baked, as explained, the constituents of the liquid binder are driven off or oxidized, and the powederd fluorescent or luminescent material will adhere to the wall of the tube or bulb. The presence of the small amount of inorganic substance, aids in the proper adhesion of the fluorescent or luminescent material to the tube or bulb. The tube or bulb will be found to be coated or covered by a thin layer of the fluorescent or luminescent material, when 50 grams of the powdered material is added to 100 cc. of the binder. This coating will be uniform throughout and will not be porous as viewed with the naked eye. This coated surface will provide a uniform light transmitting surface or coat. When it is desired to provide a thick coat, the relative amount of the powdered fluorescent or luminescent material is increased with respect to the fixed amount of the binder.

It is preferred to use the camphor, as a plasticizer and stabilizer, with the low viscosity nitro-cellulose, for the presence of the camphor causes better adhesion, more flexibility, and tends to prevent discoloration in operation. However, I contemplate using other plasticizers with the low viscosity nitro-cellulose, and I may use butyl phthalate, as a plasticizer. When this is done, about two or three drops of the butyl phthalate has been found sufficient to add to about 100 cc. of the nitro-cellulose of low viscosity.

I prefer to add the afore-mentioned amounts of the inorganic substances such as sodium silicate, as this substance causes a better adhesion of the fluorescent or luminescent powders with the glass, during the heating or baking operation, in obtaining the final product. However, satisfactory results can be obtained by omitting this inorganic substance. I found that the low viscosity nitro-cellulose will produce a binder that will keep the powdered fluorescent or luminescent material in suspension, a sufficient length of time, so that the coating will be properly applied, to produce a uniform and even coated surface.

The low viscosity for the nitro-cellulose, given in seconds, is the time required, in the given liquid, for a standard steel ball to drop ten inches.

It is to be understood that the forms of my invention herewith shown and described are to be taken as preferred examples of the same and that various changes may be made in the steps of the method and that known chemical equivalents may be employed and that changes may be made in the proportions of the ingredients, without departing from the spirit of the invention or the scope of the subjoined claims.

Having thus described my invention, what I claim is:

1. A liquid composition for coating tubes, bulbs or the like formed of glass or the like, comprising a liquid binder which comprises substantially 1.5 grams of nitro-cellulose having a low viscosity of 50 to 100 seconds, substantially 0.5 gram of camphor, and substantially 100 cc. of a solvent, and substantially 50 grams of powdered fluorescent or luminescent material to each 100 cc. of the liquid binder.

2. A method of producing a low viscosity liquid coating for tubes, bulbs or the like formed of glass or the like, comprising dissolving approximately 2 grams of Celluloid containing 1.5 grams of nitrocellulose having a low viscosity of 50 to 100 seconds and 0.5 gram of camphor in approximately 100 cc. of a solvent, and then adding approximately 50 grams of a powdered fluorescent or luminescent material to 100 cc. of the liquid mass for producing a suspension of the powdered material in the liquid.

THOMAS M. CORTESE.